US008574764B2

(12) United States Patent
Sung et al.

(10) Patent No.: US 8,574,764 B2
(45) Date of Patent: *Nov. 5, 2013

(54) NEGATIVE ACTIVE MATERIAL INCLUDING SILICON ACTIVE PARTICLES SURROUNDED BY COPPER, ALUMINUM AND TIN METAL MATRIX AND RECHARGEABLE LITHIUM BATTERY INCLUDING THE SAME

(75) Inventors: Min-Seok Sung, Suwon-si (KR); Sang-Jin Kim, Suwon-si (KR); Goo-Jin Jeong, Suwon-si (KR); Yong-Mook Kang, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 969 days.

This patent is subject to a terminal disclaimer.

(21) Appl. No.: 11/987,135

(22) Filed: Nov. 27, 2007

(65) Prior Publication Data
US 2008/0145759 A1 Jun. 19, 2008

(30) Foreign Application Priority Data

Nov. 27, 2006 (KR) ........................ 10-2006-0117967

(51) Int. Cl.
*H01M 4/00* (2006.01)
*H01M 4/13* (2006.01)
*H01M 4/58* (2006.01)

(52) U.S. Cl.
USPC ........................................ 429/220; 429/218.1

(58) Field of Classification Search
USPC ........................................ 429/219, 218.1, 220
See application file for complete search history.

(56) References Cited

U.S. PATENT DOCUMENTS

| 6,265,111 | B1 | 7/2001 | Bito et al. |
| 6,881,518 | B2 | 4/2005 | Kaminaka et al. |
| 7,097,938 | B2 | 8/2006 | Yamada et al. |
| 7,223,498 | B2 | 5/2007 | Matsubara et al. |
| 2003/0134198 | A1* | 7/2003 | Sawa et al. ..................... 429/221 |
| 2005/0031957 | A1* | 2/2005 | Christensen et al. ....... 429/218.1 |
| 2006/0040182 | A1* | 2/2006 | Kawakami et al. ........ 429/218.1 |
| 2006/0121351 | A1 | 6/2006 | Sato et al. |
| 2006/0147802 | A1* | 7/2006 | Yasuda et al. ................. 429/233 |

FOREIGN PATENT DOCUMENTS

| CN | 1419303 | 5/2003 |
| CN | 1614799 | 5/2005 |
| CN | 1842932 | 10/2006 |
| CN | 1930726 | 3/2007 |
| EP | 1028476 | 8/2000 |
| JP | 59-020971 | 2/1984 |
| JP | 200193524 | 4/2001 |
| JP | 2002-093415 | 3/2002 |
| JP | 2003257417 | 9/2003 |

(Continued)

OTHER PUBLICATIONS

Iijima et al., Machine translation of JP 2005011650 A, Jan. 2005.*

(Continued)

*Primary Examiner* — Sean P Cullen
(74) *Attorney, Agent, or Firm* — Robert E. Bushnell, Esq.

(57) ABSTRACT

A negative active material for a rechargeable lithium battery includes Si active particles, and a 3-component to 7-component metal matrix that surrounds the active fine particles without reacting therewith. The negative active material shows high capacity and improved cycle-life characteristics.

9 Claims, 22 Drawing Sheets

(56) References Cited

FOREIGN PATENT DOCUMENTS

| | | |
|---|---|---|
| JP | 2003272613 | 9/2003 |
| JP | 2004095469 | 3/2004 |
| JP | 2004-296412 | 10/2004 |
| JP | 2004311429 A | 11/2004 |
| JP | 2005011650 A * | 1/2005 |
| JP | 2005-078999 | 3/2005 |
| JP | 2005085526 | 3/2005 |
| JP | 2005100876 | 4/2005 |
| JP | 2005294068 | 10/2005 |
| KR | 10-2000-0033684 | 6/2000 |
| KR | 20010054903 A | 7/2001 |
| KR | 1020010055503 A | 7/2001 |
| KR | 10-2004-0100058 | 12/2004 |
| KR | 1020050090220 A | 9/2005 |
| KR | 100536251 | 12/2005 |
| KR | 2007056765 A * | 6/2007 |
| KR | 1020070056323 | 6/2007 |
| WO | WO 00-60691 | 10/2000 |
| WO | WO 01/52337 | 7/2001 |
| WO | WO 02-103822 | 12/2002 |
| WO | WO 2005-018026 | 2/2005 |
| WO | WO 2005-048381 | 5/2005 |

OTHER PUBLICATIONS

Machine translation of KR 2007056765 A, Sheem et al., Jun. 2007.*

*Search Report* from the European Patent Office issue in applicant's corresponding European Application No. 07121570.1 dated Mar. 20, 2008.

Japanese Office Action dated Sep. 14, 2010 issued by the Japanese Intellectual Property Office, corresponding to Japanese Patent Application No. 2007-164317, together with a Request for Entry.

\* cited by examiner

70(90Si-10Sn)-30(88.3Cu-11.7Al)

50(90Si-0%Sn)-50(88.3Cu-11.7Al)
quenching roll velocity:3000rpm

NEGATIVE ACTIVE MATERIAL INCLUDING SILICON ACTIVE PARTICLES SURROUNDED BY COPPER, ALUMINUM AND TIN METAL MATRIX AND RECHARGEABLE LITHIUM BATTERY INCLUDING THE SAME

CROSS-REFERENCE TO RELATED APPLICATION AND CLAIM FOR PRIORITY

This application claims priority to and the benefit of Korean Patent Application No. 10-2006-0117967 filed in the Korean Intellectual Property Office on Nov. 27, 2006, the entire content of which is incorporated herein by reference.

BACKGROUND OF THE INVENTION (a) Field of the Invention

The present invention relates to a negative active material for a rechargeable lithium battery, and a rechargeable lithium battery including the same.

(b) Description of the Related Art

Rechargeable lithium batteries use materials that are capable of reversibly intercalating or deintercalating lithium ions in positive and negative electrodes, and include an organic electrolyte solution or a polymer electrolyte between the positive and negative electrodes. Rechargeable lithium batteries generate electrical energy by an oxidation/reduction reaction during the intercalation/deintercalation of lithium ions at the positive and negative electrodes.

For a positive active material, composite metal oxides, such as $LiCoO_2$, $LiMn_2O_4$, $LiNiO_2$, $LiNi_{1-x}Co_xO_2$ (0<x<1), and $LiMnO_2$, have been researched.

Conventionally, lithium metals have been used as a negative active material for a rechargeable lithium battery. However, an explosion can be caused by a short circuit of the battery due to formation of dendrites when using the lithium metal. Therefore, carbonaceous materials, such as amorphous carbon, and crystalline carbon, have recently been used as the negative active material in place of lithium metals. However, such carbonaceous materials impart a non-reversible capacity of 5 to 30% during the first several cycles, which wastes lithium ions and prevents at least one active material from being fully charged and discharged. Therefore, it has a disadvantage in its energy density.

In addition, it has recently become known that a metal negative active material such as Si, Sn, and so on, which is supposed to have a high capacity, has a problem in that it imparts non-reversible capacity characteristics. Further, the tin oxide disclosed by Japan Fuji Film. Co., Ltd. has come into the spotlight as an alternative to the carbonaceous material negative active material. However, the metal negative active material shows 30% or less initial Coulomb efficiency. Further, as lithium is continuously intercalated and deintercalated to generate a lithium-metal alloy, the capacity is remarkably decreased and the capacity preserving rate is remarkably deteriorated after repeating 150 charge and discharge cycles so that it cannot be commercially viable. Accordingly, much research has recently been undertaken to improve these characteristics.

SUMMARY OF THE INVENTION

The present invention provides an improved negative active material.

One embodiment of the present invention provides a negative active material for a rechargeable lithium battery having high capacity, and excellent cycle-life and efficiency characteristics.

Another embodiment of the present invention provides a rechargeable lithium battery including the negative active material.

According to an embodiment of the present invention, provided is a negative active material for a rechargeable lithium battery, which includes Si active particles, and a three to seven-component metal matrix that surrounds the active particles without chemically reacting with the Si active particles.

The metal matrix is a solid-solution alloy.

The metal matrix includes Cu, Al, and an additive metal.

The additive metal is selected from the group consisting of Zn, Ga, In, Sn, Ag, and combinations thereof. According to one embodiment, Sn is appropriate.

The active particles and the metal matrix are present in an alloy.

The alloy is represented by the following Formula 1.

$$xSi\text{-}y(aCu\text{-}bAl)\text{-}zX \qquad \text{[Chemical Formula 1]}$$

Wherein x ranges from 30 to 70 wt %;
y ranges from 30 to 70 wt %;
z is more than 0 wt % and 30 wt % or less;
x+y+z is 100 wt %, and y+z is 30 to 70 wt %;
when a+b is 100 wt %, a weight ratio of a and b ranges from 70:30 to 95:5; and
X is an additive metal that forms a solid-solution alloy with Cu and Al and is selected from the group consisting of Zn, Ga, In, Sn, Ag, and combinations thereof.

According to one embodiment, in the above Formula 1, when a+b is 100 wt %, a weight ratio of a and b ranges from 85:15 to 95:5.

The negative active material includes 30 to 70 wt % of the metal matrix. According to one embodiment, the negative active material includes 40 to 60 wt % of the metal matrix.

The negative active material includes 30 to 70 wt % of the Si active particles. According to one embodiment, the negative active material includes 40 to 60 wt % of the Si active particles.

In the metal matrix, Cu and Al are present in a weight ratio of 70:30 to 95:5. According to one embodiment, Cu and Al are present in a weight ratio of 85:15 to 95:5.

The metal matrix includes the additive metal in an amount of more than 0 wt % but 30 wt % or less.

The active particles have an average particle diameter of 10 nm to 1,000 nm. According to one embodiment, the active particles have an average particle diameter of 10 nm to 500 nm.

According to another embodiment of the present invention, provided is a rechargeable lithium battery that includes a negative electrode including the negative active material, a positive electrode including a positive active material that can reversely intercalate/deintercalate lithium ions, and an electrolyte.

According to another embodiment of the present invention, provided is a method of preparing a negative active material that includes: mixing Si active particles and three to seven kinds of metals to obtain a mixture; melting the mixture; and quenching the molten mixture to prepare the negative active material comprising a metal matrix including said three to seven kinds of metals and the Si active particles surrounded by the metal matrix.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE EMBODIMENTS

Figure 1:
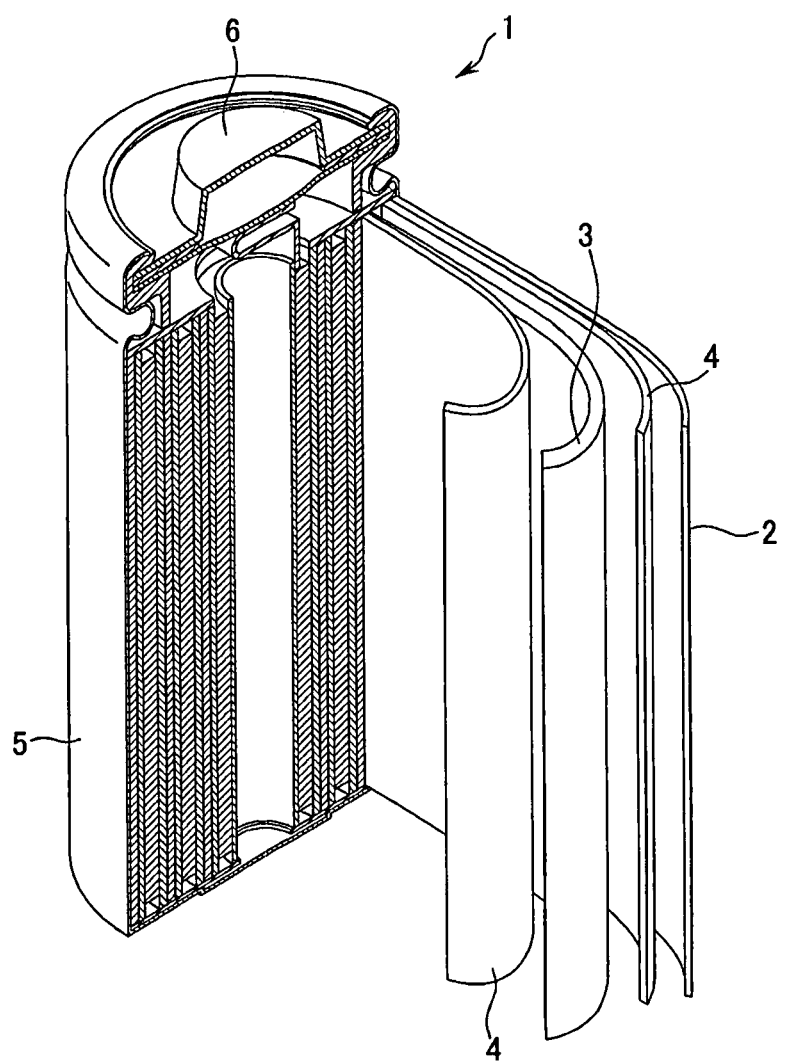
FIG. 1 schematically shows a rechargeable lithium battery according to one embodiment of the present invention.

The present invention relates to a high-capacity negative active material for a rechargeable lithium battery including Si. Si capable of providing a high-capacity to a negative active material for a rechargeable lithium battery has gained attention, but has not yet been practically used since, on the charge and discharge of the battery, the volume is overly expanded, seriously deteriorating the cycle-life characteristics.

Accordingly, in order to solve such volume expansion problem, a negative active material including Si, Cu, and Al has recently been researched. The negative active material including Si, Cu, and Al can significantly solve the volume expansion problem due to the fine particle structure. However, it has practical difficulties due to restrictions such as the composition ratio and the quenching speed.

One embodiment of the present invention provides a negative active material capable of solving the volume expansion problem and of being manufactured under various conditions.

A negative active material for a rechargeable lithium battery according to one embodiment includes Si active particles, and a 3-component to 7-component metal matrix that surrounds the active fine particles, but does not chemically react with the Si active particles. Particularly, a large amount of Si active particles is present in the negative active material powder, and a metal matrix surrounds the Si active particles so that the Si active particles are firmly connected with each other.

The metal matrix may include a 3-component to 7-component alloy that does not react with Si active particles. According to another embodiment, it includes a 3-component to 7-component alloy including Cu, Al, and an additive metal. If the metal matrix is at least a 3-component alloy, it may generate at least a 4-component negative active material including the Si active particles. The 4-component negative active material can be produced in more various compositions and under more various conditions, compared to a 3-component negative active material. Thereby, it can be mass produced.

The metal matrix may be a solid-solution alloy.

Cu improves the conductivity in the negative active material. However, when the metal matrix includes only Cu, Cu is reacted with Si to generate a brittle compound such as $Cu_3Si$ or $Cu_4Al$, which is not suitable to solve the Si volume expansion problem.

Al reacts with Cu to generate a solid-solution alloy. Generally, if Cu is reacted with Si, it generates a Cu—Si-based intermetallic compound. According to one embodiment of the present invention, if Cu is used together with Al, Cu is reacted with Al before the reaction of Cu with Si. Accordingly, it prevents generation of a Cu—Si-based intermetallic compound.

The additive metal is not reacted with Si and is solid-dissolved in the metal matrix to generate a solid-solution alloy. Further, it can produce the fine particle structure under various conditions and compositions. The additive metal is selected from the group consisting of Zn, Ga, In, Sn, Ag, and combinations thereof. According to one embodiment, Sn is preferable. Among the additive metals, Ga, In, Sn, Ag, and so on are known to react with Li. However, according to one embodiment of the present invention, the additive metal is solid-dissolved in the metal matrix so that it is not reacted with Li.

According to one embodiment of the present invention, the negative active material includes an alloy of the metal matrix with the Si active particles, which does not form a compound between metals. The alloy may be represented by the following Chemical Formula 1.

$$xSi\text{-}y(aCu\text{-}bAl)\text{-}zX \qquad \text{[Chemical Formula 1]}$$

Wherein x ranges from 30 to 70 wt %;
y ranges from 30 to 70 wt %;
z is more than 0 wt % and 30 wt % or less;
x+y+z is 100 wt %, and y+z is 30 to 70 wt %;
when a+b is 100 wt %, a weight ratio of a and b ranges from 70:30 to 95:5; and
X is an additive metal that forms a solid-solution alloy with Cu and Al and is selected from the group consisting of Zn, Ga, In, Sn, Ag, and combinations thereof.

According to one embodiment, in the above Formula 1, when a+b is 100 wt %, a weight ratio of a and b ranges from 85:15 to 95:5.

Here, x, y, and z refer to weight percents of each component of the total alloy weight, with y being the amount of a Cu—Al solid-solution alloy, and z being the amount of the additive metal X of the total alloy.

The negative active material may include 30 to 70 wt % of the metal matrix. According to one embodiment, the negative active material includes 40 to 60 wt % of the metal matrix. When amount of the metal matrix is less than 30 wt %, it can not suppress the volume expansion problem when the Si particles are reacted with Li. On the other hand, when it more than 70 wt %, it causes deterioration of the capacity.

The negative active material includes 30 to 70 wt % of the Si active particles. According to one embodiment, the negative active material includes 40 to 60 wt % of the Si active particles. It is preferable that the amount of Si active particles is within the above range (i.e., between 30 and 70 wt %), since the capacity and cycle-life characteristics of the battery including the same are significantly improved. When it is less than 30 wt %, the metal-based negative active material is not effectively utilized due to insufficient capacity. Further, when it is more than 70 wt %, the cycle-life is remarkably deteriorated since the volume expansion rate is further increased when it is reacted with lithium.

The additive metal (X) is present in an amount of more than 0 wt % but 30 wt % or less. According to one embodiment, the additive metal (X) is present in an amount of 2 to 10 wt %. It is preferable that the amount of the additive metal is within the above range (i.e., more than 0 wt % but 30 wt % or less), since, with the above range of the additive metal, the Si active material effectively forms fine particles and a uniform Cu—Al metal matrix is provided. When the amount is more than 30 wt %, it may cause problems in that the initial efficiency is remarkably decreased on the electrochemical characteristic test of a battery including the same.

Herein, the additive metal may include Sn. According to one embodiment, the negative active material including the additive metal is represented by a Si—Cu—Al—Sn alloy. The amount of Sn in the alloy may range of more than 0 wt % but 15 wt % or less. According to another embodiment, it ranges from 2.5 to 5 wt %. When Sn is included up to 15 wt %, the initial efficiency is excellent. Even if Sn is added in a small amount just more than 0 wt %, the Si active material can be still sufficiently pulverized. Further, when Sn is added in 2.5 wt % or more, it is more preferable since Si is more effectively pulverized.

In the metal matrix, Cu and Al are present in a weight ratio of from 70:30 to 95:5. According to one embodiment, Cu and Al are present in a weight ratio of 85:15 to 95:5. When the composition ratio of Cu and Al is out of this range, it is not preferable since Cu and Si form an intermetallic compound.

In addition, in the case of a 3-component, 4-component, 5-component, 6-component, or 7-component metal alloy matrix including Cu and Al in addition to at least one metal represented by X in Chemical Formula 1, the composition ratio between Cu and Al should be maintained. When it is out of such composition ratio, it cannot effectively suppress generation of the metal compound between Cu and Si.

The active fine particles have an average particle diameter of 10 nm to 1,000 nm. According to one embodiment, the active fine particles have an average particle diameter of 10 um to 500 nm. When the average particle diameter of the Si active particles is more than 1,000 nm, the thickness of the matrix is too thin to prevent the deformation on the volume expansion. It is difficult to provide an average particle diameter less than 10 nm.

The negative active material according to an embodiment of the present invention, is prepared by, for example, a quenching ribbon method including mixing Si and three to seven kinds of metals, which do not react with Si when they are in the mixture, melting the resulting mixture at 1500° C. or more, and spraying the molten product onto a rotating kappa roll. Herein, quenching speed in the method is the rotation rate of the kappa roll. A fast rotation rate of the kappa roll is preferable, and in the present embodiment it may be 2,000 rpm or more. When the rotation rate of the kappa roll is less than 2,000 rpm, Si active particles are coarser, deteriorating the cycle-life characteristics. Accordingly, it is preferable that the rotation rate of the kappa roll is 2,000 rpm or more, since thereby, Si active particles are provided. Further, when the rotation rate of the Kappa roll is increased, it does not cause problems. Thus, the maximum value of the rotation rate of the kappa roll is not limited.

Further, any other quenching method instead of the quenching ribbon method may be used as long as it provides sufficient quenching speed.

The rechargeable lithium battery including the negative active material according to the present embodiment may include a negative electrode, a positive electrode, and an electrolyte. The positive electrode may include an active material that includes a lithiated intercalation compound being capable of reversible intercalation and deintercalation of lithium. Specific examples of the lithiated intercalation compound may be a composite oxide including lithium and a metal selected from the group consisting of cobalt, manganese, nickel, and combinations thereof, represented by the following Formulas 2 to 26.

$Li_aA'_{1-b}B'_bD'_2$ [Chemical Formula 2]

Wherein, in the above formula, $0.95 \le a \le 1.1$, and $0 \le b \le 0.5$.

$Li_aE'_{1-b}B'_bO_{2-c}F'_c$ [Chemical Formula 3]

Wherein, in the above formula, $0.95 \le a \le 1.1$, $0 \le b \le 0.5$, and $0 \le c \le 0.05$.

$LiE'_{2-b}B'_bO_{4-c}F'_c$ [Chemical Formula 4]

Wherein, in the above formula, $0 \le b \le 0.5$, and $0 \le c \le 0.05$.

$Li_aNi_{1-b-c}Co_bB'_cD'_\alpha$ [Chemical Formula 5]

Wherein, in the above formula, $0.95 \le a \le 1.1$, $0 \le b \le 0.5$, $0 \le c \le 0.05$, and $0 < \alpha \le 2$.

$Li_aNi_{1-b-c}Co_bB'_cO_{2-\alpha}F'_\alpha$ [Chemical Formula 6]

Wherein, in the above formula, $0.95 \le a \le 1.1$, $0 \le b \le 0.5$, $0 \le c \le 0.05$, and $0 < \alpha < 2$.

$Li_aNi_{1-b-c}Co_bB'_cO_{2-\alpha}F'_2$ [Chemical Formula 7]

Wherein, in the above formula, $0.95 \le a \le 1.1$, $0 \le b \le 0.5$, $0 \le c \le 0.05$, and $0 < \alpha < 2$.

$Li_aNi_{1-b-c}Mn_bB'_cD'\alpha$ [Chemical Formula 9]

Wherein, in the above formula, $0.95 \le a \le 1.1$, $0 \le b \le 0.5$, $0 \le c \le 0.05$, and $0 < \alpha \le 2$.

$Li_aNi_{1-b-c}Mn_bB'_cO_{2-\alpha}F'_\alpha$ [Chemical Formula 10]

Wherein, in the above formula, $0.95 \le a \le 1.1$, $0 \le b \le 0.5$, $0 \le c \le 0.05$, and $0 < \alpha < 2$.

$LiaNi_{1-b-c}Mn_bB'_cO_{2-\alpha}F'_2$ [Chemical Formula 11]

Wherein, in the above formula, $0.95 \le a \le 1.1$, $0 \le b \le 0.5$, $0 \le c \le 0.05$, and $0 < \alpha < 2$.

$Li_aNi_bE'_cG'_dO_2$ [Chemical Formula 12]

Wherein, in the above formula, $0.90 \le a \le 1.1$, $0 \le b \le 0.9$, $0 \le c \le 0.5$, and $0.001 \le d \le 0.1$.

$Li_aNi_bCo_cMn_dG'_eO_2$ [Chemical Formula 13]

Wherein, in the above formula, $0.90 \le a \le 1.1$, $0 \le b \le 0.9$, $0 \le c \le 0.5$, $0 \le d \le 0.5$, and $0.001 \le e \le 0.1$.

$Li_aNiG'_bO_2$ [Chemical Formula 14]

Wherein, in the above formula, $0.90 \le a \le 1.1$, and $0.001 \le b \le 0.1$.

$Li_{aCo}G'_bO_2$ [Chemical Formula 15]

Wherein, in the above formula, $0.90 \le a \le 1.1$, and $0.001 \le b \le 0.1$.

$Li_aMnG'_bO_2$ [Chemical Formula 16]

Wherein, in the above formula, $0.90 \le a \le 1.1$, and $0.001 \le b \le 0.1$.

$Li_aMn_2G'_bO_4$ [Chemical Formula 17]

Wherein, in the above formula, $0.90 \leq a \leq 1.1$, and $0.001 \leq b \leq 0.1$.

$$Q'O_2 \qquad [\text{Chemical Formula 18}]$$

$$Q'S_2 \qquad [\text{Chemical Formula 19}]$$

$$LiQ'S_2 \qquad [\text{Chemical Formula 20}]$$

$$V_2O_5 \qquad [\text{Chemical Formula 21}]$$

$$LiV_2O_5 \qquad [\text{Chemical Formula 22}]$$

$$LiI'O_2 \qquad [\text{Chemical Formula 23}]$$

$$LiNiVO_4 \qquad [\text{Chemical Formula 24}]$$

$$Li_{3-f}J'_2(PO_4)_3 \qquad [\text{Chemical Formula 25}]$$

Where, $0 \leq f \leq 3$.

$$Li_{3-f}Fe_2(PO_4)_3 \qquad [\text{Chemical Formula 26}]$$

Where, $0 \leq f \leq 2$.

In the above Formulas 2 to 26:

A' is selected from the group consisting of Ni, Co, Mn, and combinations thereof, B' is selected from the group consisting of Al, Ni, Co, Mn, Cr, Fe, Mg, Sr, V, a rare earth element, and combinations thereof;

D' is selected from the group consisting of O, F, S, P, and combinations thereof, E' is selected from the group consisting of Co, Mn, and combinations thereof;

F' is selected from the group consisting of F, S, P, and combinations thereof;

G' is selected from the group consisting of Al, Cr, Mn, Fe, Mg, La, Ce, Sr, V, Lanthanide, and combinations thereof;

Q' is selected from the group consisting of Ti, Mo, Mn, and combinations thereof;

I' is selected from the group consisting of Cr, V, Fe, Sc, Y, and combinations thereof; and J' is selected from the group consisting of V, Cr, Mn, Co, Ni, Cu, and combinations thereof.

The positive active material may be at least one selected from the group consisting of elemental sulfur ($S_8$), and a sulfur-based compound such as $Li_2S_n$ ($n \geq 1$), $Li_2S_n$ ($n \geq 1$) dissolved in a catholyte, an organic sulfur compound, or a carbon-sulfur polymer ($(C_2S_f)_n$: f=2.5 to 50, $n \geq 2$).

The positive electrode can be fabricated as follows: a positive active material composition including a positive active material, a binder, and optionally a conductive agent mixed in a solvent is applied on a positive current collector such as aluminum.

The negative can be fabricated as follows: a negative active material, a binder, and optionally a conductive agent are mixed in a solvent to prepare a negative active material composition, and the composition is applied onto a negative current collector. The methods of fabricating the electrodes are well known in the art pertaining to the present invention.

Any electrically conductive material may be used as a conductive agent unless it causes a chemical change. Examples of the conductive agent include natural graphite, artificial graphite, carbon black, acetylene black, ketjen black, carbon fiber, a metal powder or a metal fiber including copper, nickel, aluminum, silver, and so on, a polyphenylene derivative disclosed in Japanese Patent laid-open Sho 59-20971, which is incorporated herein by reference, or combinations thereof.

Examples of the binder include, but are not limited to, polyvinylalcohol, carboxymethyl cellulose, hydroxypropylene cellulose, diacetylenecellulose, polyvinylchloride, polyvinylpyrrolidone, polytetrafluoroethylene, polyvinylidene fluoride, polyethylene, or polypropylene.

The solvent can be N-methylpyrrolidone, but it is not limited thereto.

In the non-aqueous-based electrolyte rechargeable battery, the non-aqueous electrolyte includes a non-aqueous organic solvent and a lithium salt.

The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethanol, isopropyl alcohol, and so on. Examples of the aprotic solvent include a nitrile such as X—CN (wherein X is a C2 to C20 linear, branched, or cyclic hydrocarbon, a double bond, an aromatic ring, or an ether bond), an amide such as dimethylformamide, a dioxolane such as 1,3-dioxolane, sulfolane, and so on.

The non-aqueous organic solvent may be used singularly or as a mixture. When the organic solvent is used as a mixture, the mixture ratio can be controlled in accordance with a desirable battery performance.

The carbonate-based solvent may include a mixture of a cyclic carbonate and a chain carbonate. When the cyclic carbonate and the chain carbonate are mixed together in a volume ratio of from 1:1 to 1:9, and the mixture is used as an electrolyte, the electrolyte performance may be enhanced.

In addition, the electrolyte according to one embodiment of the present invention may further include mixtures of carbonate-based solvents and aromatic hydrocarbon-based solvents. The carbonate-based solvents and the aromatic hydrocarbon-based solvents are mixed together in a volume ratio of from 1:1 to 30:1.

The aromatic hydrocarbon-based organic solvent may be represented by the following Formula 27.

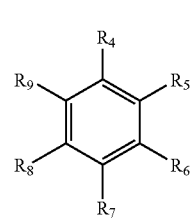

[Chemical Formula 27]

Where $R_1$ to $R_6$ are independently selected from the group consisting of hydrogen, a halogen, a C1 to C10 alkyl, a haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof The lithium salts act as a lithium-ion source, helping basic battery operation.

The lithium salt includes, but is not limited to, at least one supporting salt selected from the group consisting of $LiPF_6$, $LiBF_4$, $LiSbF_6$, $LiAsF_6$, $LiCF_3SO_3$, $LiN(CF_3SO_2)_2$, $LiN(C_2F_5SO_2)_2$, $LiC_4F_9SO_3$, $LiClO_4$, $LiAlO_2$, $LiAlCl_4$, $LiN(C_pF_{2p+1}SO_2)(C_qF_{2q+1}SO_2)$ (where p and q are natural numbers), LiCl, and LiI.

The concentration of the lithium salt ranges from 0.6 to 2.0 M. In one embodiment, the concentration of the lithium salts ranges from 0.7 to 1.6 M. When the concentration of the lithium salt is less than 0.6 M, the electrolyte performance is deteriorated due to its low ionic conductivity. When the concentration of the lithium salt is greater than 2.0 M, the lithium ion mobility is decreased due to an increase of the electrolyte viscosity.

The non-aqueous electrolyte may further include an overcharge inhibiting additive such as ethylene carbonate, pyrocarbonate, and so on.

The solid electrolyte includes a polyethylene oxide polymer electrolyte or a polymer electrolyte including at least one polyorganosiloxane side chain or polyoxyalkylene side chain, a sulfide electrolyte such as $Li_2S$—$SiS_2$, $Li_2S$—$GeS_2$, $Li_2S$—$P_2S_5$, or $Li_2S$—$B_2S_3$, or an inorganic electrolyte such as $Li_2S$—$SiS_2$—$Li_3PO_4$, or $Li_2S$—$SiS_2$—$Li_2SO_4$.

FIG. 1 shows a rechargeable lithium battery having the above-mentioned structure according to an embodiment of the present invention. FIG. 1 illustrates a cylindrical lithium ion cell 1 as one embodiment, which includes a negative electrode 2, a positive electrode 3, a separator 4 interposing between the negative electrode 2 and the positive electrode 3, an electrolyte impregnating the separator 4, a battery case 5, and a sealing member 6 sealing the battery case 5. The rechargeable lithium battery according to the present embodiment is not limited to the above-mentioned shape, and may be shaped into a prismatic shape, a pouch, and so on.

The following examples illustrate the present embodiment in detail. However, it is understood that the present invention is not limited by these examples.

Example 1

A mother-alloy including 47.5 wt % of Si, 2.5 wt % of Sn, and 50 wt % of Cu—Al including Cu and Al in a weight ratio of 88.3:11.7 was prepared using an arc melting method under an argon gas atmosphere. A negative active material for a rechargeable lithium battery was prepared using the above Si—Cu—Al—Sn alloy by a quenching ribbon method. Herein, quenching speed (i.e., a rotating speed of a kappa roll) was set to be 3,000 rpm.

Example 2

A negative active material was prepared according to the same method as in Example 1, except that a mother-alloy including 45 wt % of Si, 5 wt % of Sn, and 50 wt % of Cu—Al including Cu and Al in a weight ratio of 88.3:11.7 was prepared.

Example 3

A negative active material was prepared according to the same method as in Example 1, except that a mother-alloy including 40 wt % of Si, 10 wt % of Sn, and 50 wt % of Cu—Al including Cu and Al in a weight ratio of 88.3:11.7 was prepared.

Example 4

A negative active material was prepared according to the same method as in Example 1, except that a mother-alloy including 35 wt % of Si, 15 wt % of Sn, and 50 wt % of Cu—Al including Cu and Al in a weight ratio of 88.3:11.7 was prepared.

Example 5

A negative active material was prepared according to the same method as in Example 1, except that a mother-alloy including 30 wt % of Si, 20 wt % of Sn, 50 wt % of Cu—Al including Cu and Al in a weight ratio of 88.3:11.7 was prepared.

Example 6

A negative active material was prepared according to the same method as in Example 1, except that the quenching speed was set to be 4,000 rpm.

Example 7

A negative active material was prepared according to the same method as in Example 2, except that the quenching speed was set to be 4,000 rpm.

Example 8

A negative active material was prepared according to the same method as in Example 3, except that the quenching speed was set to be 4,000 rpm.

Example 9

A negative active material was prepared according to the same method as in Example 4, except that the quenching speed was set to be 4,000 rpm.

Example 10

A negative active material was prepared according to the same method as in Example 5, except that the quenching speed was set to be 4,000 rpm.

Example 11

A negative active material was prepared according to the same method as in Example 1, except that a mother-alloy including 63 wt % of Si, 7 wt % of Sn, and 30 wt % of Cu—Al including Cu and Al in a weight ratio of 88.3:11.7 was prepared.

Comparative Example 1

An alloy including 40 wt % of Si, and 60 wt % of Cu was prepared using an arc melting method. Then, a ribbon-type Si—Cu negative active material was prepared using the alloy by a quenching ribbon method where the rotating speed of a quenching roll was set to be 2,000 rpm.

Comparative Example 2

An alloy including 40 wt % of Si, and 60 wt % of Cu—Al including Cu and Al in a weight ratio of 88.3:11.7 was prepared using an arc melting method. Then, a ribbon-type Si—Cu—Al negative active material was prepared using the alloy by a quenching ribbon method where the rotating speed of a quenching roll was set to be 2,000 rpm.

Comparative Example 3

A negative active material was prepared according to the same method as in Comparative Example 1, except that an alloy including 30 wt % of Si, 61.8 wt % of Cu, and 8.2 wt % of Al was prepared.

Comparative Example 4

A negative active material was prepared according to the same method as in Comparative Example 1, except that an alloy including 40 wt % of Si, 52.98 wt % of Cu, and 7.02 wt % of Al was prepared.

Comparative Example 5

A negative active material was prepared according to the same method as in Comparative Example 1, except that an alloy including 50 wt % of Si, 44.15 wt % of Cu, and 5.85 wt % of Al was prepared.

Comparative Example 6

A negative active material was prepared according to the same method as in Comparative Example 1, except that an alloy including 60 wt % of Si, 35.08 wt % of Cu, and 4.92 wt % of Al was prepared.

Comparative Example 7

A negative active material was prepared according to the same method as in Comparative Example 1, except that an alloy including 50 wt % of Si, 44.15 wt % of Cu, and 5.85 wt% of Al was prepared and the quenching speed was set to be 3,000 rpm.

Comparative Example 8

A negative active material was prepared according to the same method as in Comparative Example 7, except that the quenching speed was set to be 4,000 rpm.

X-ray Diffraction (XRD) Measurement Result (Cu—Al Composition Ratio)

Figure 2:
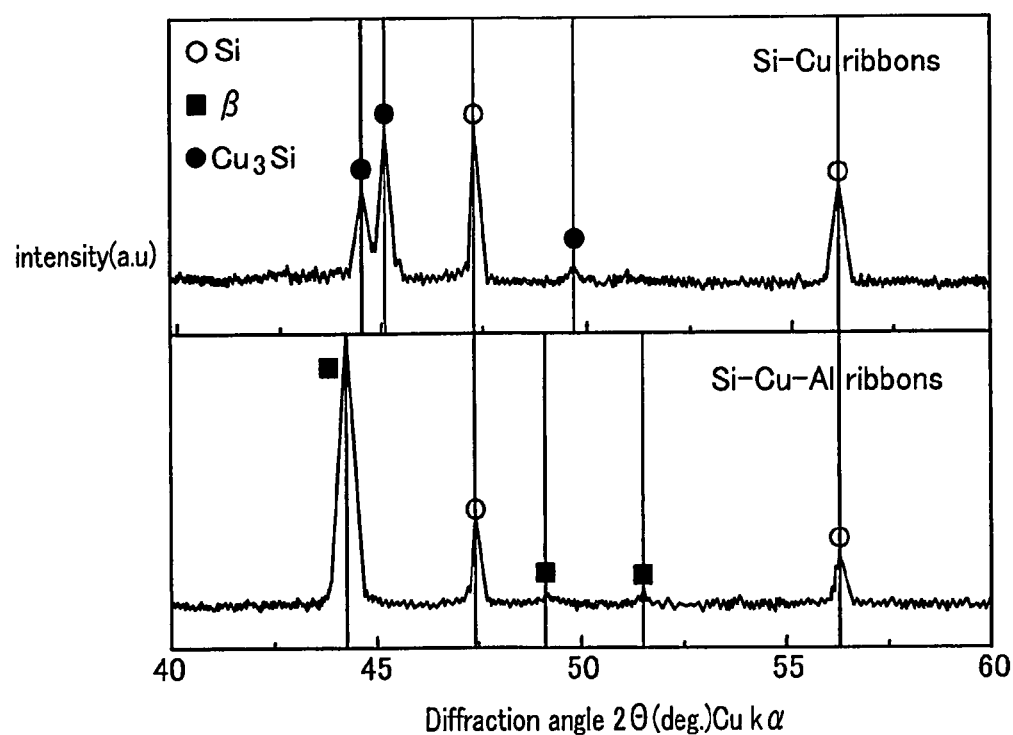
FIG. 2 shows X-ray diffraction (XRD) measurement results of the negative active materials according to Comparative Examples 1 and 2.

The Si—Cu alloy obtained from Comparative Example 1 and the Si—Cu—Al alloy obtained from Comparative Example 2 were measured to determine XRD, and the results are shown in FIG. 2. As shown in FIG. 2, generation of a Si—Cu-based metal compound is suppressed by adding a trace amount of Al.

Figure 3:
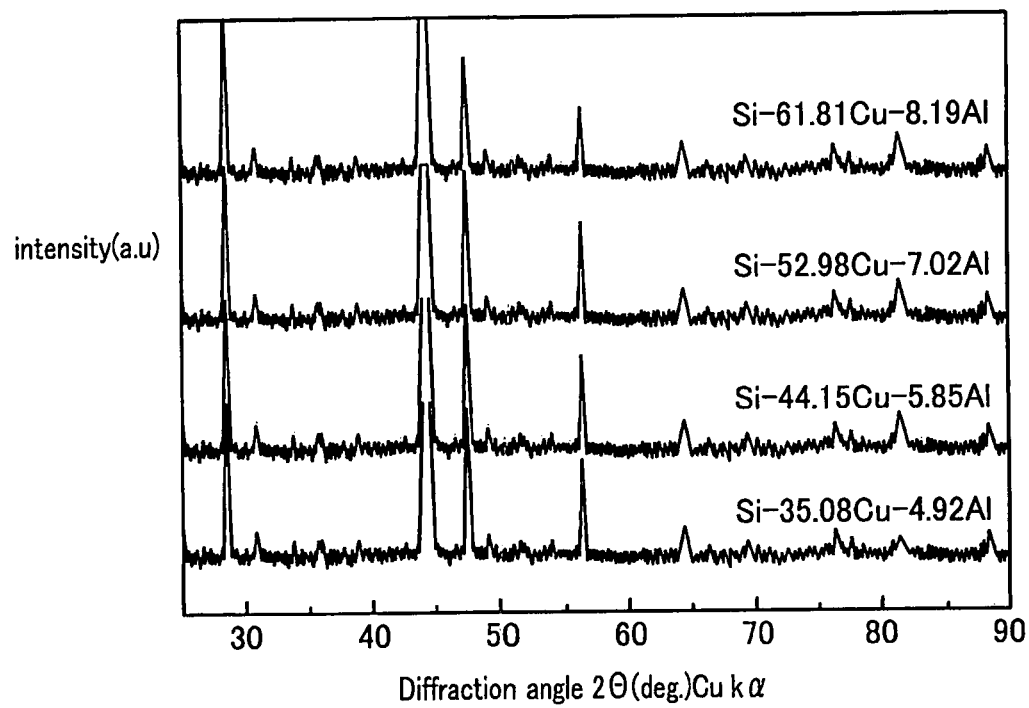
FIG. 3 shows XRD measurement results of the various alloys according to Comparative Examples 3 to 6.

The negative active materials obtained from Comparative Examples 3 to 6 were measured to determine XRD, and the results are shown in FIG. 3.

In FIG. 3, the numbers before Cu and Al respectively stand for the amount of Cu and Al included in the negative active material. The amount of Si is not shown in FIG. 3, but it will be the remaining amount after subtracting the amounts of Cu and Al from 100%. As shown in FIG. 3, generation of a Si—Cu metal compound is effectively suppressed as long as the weight ratio of Cu and Al in the Cu—Al metal matrix is maintained within from 85:15 to 92:8, even though the weight ratio of the Cu—Al metal matrix is changed.

Scanning Electron Microscope (SEM) Monitoring Results

Figure 4A:
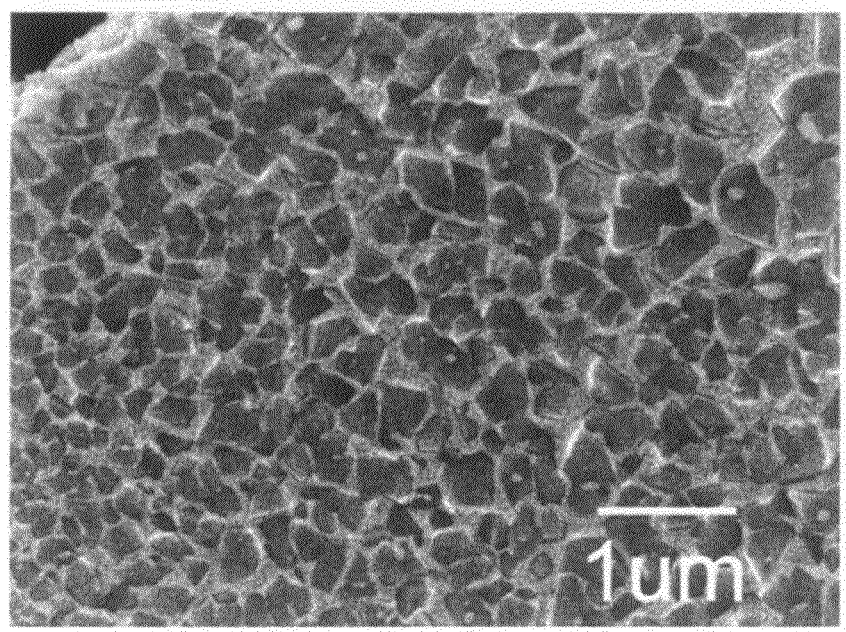
FIG. 4A shows 10,000× scanning electron microscope (SEM) photograph of the negative active material according to Comparative Example 7.
Figure 4B:
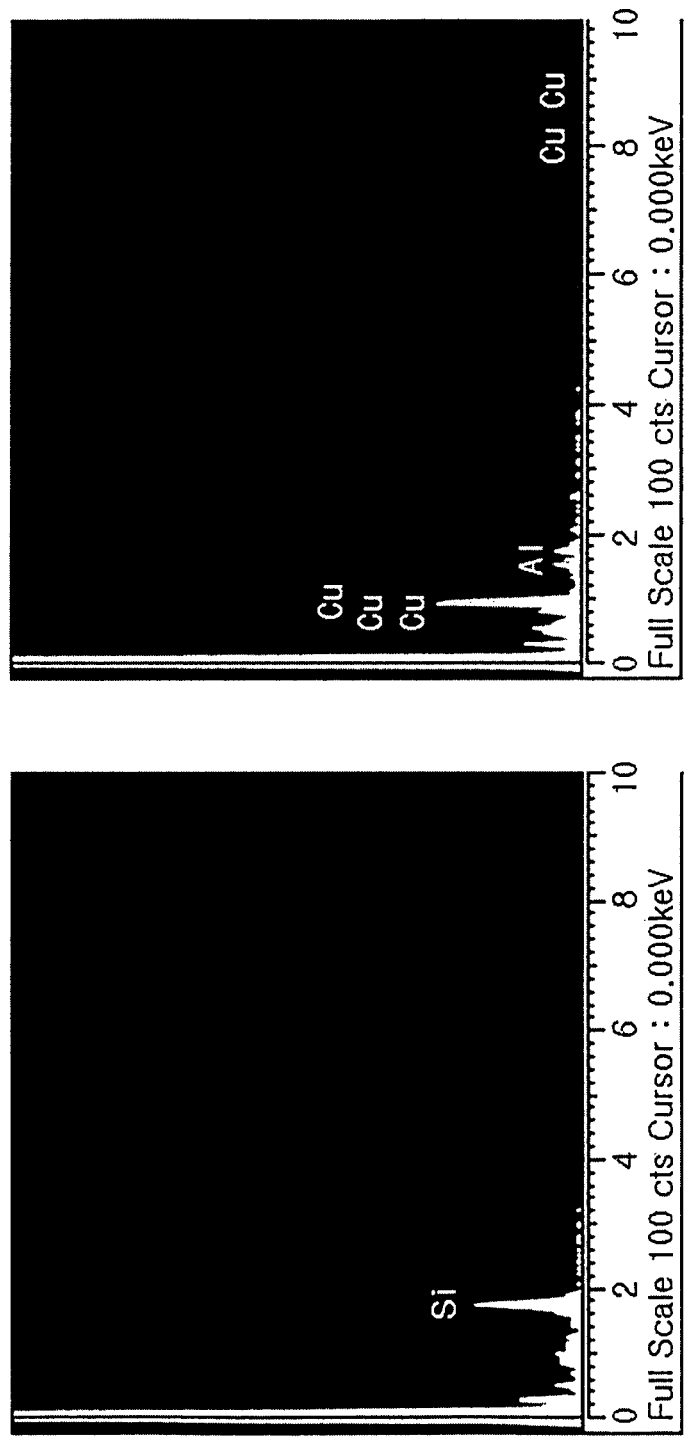
FIG. 4B shows EDS measurement results of the negative active material according to Comparative Example 7.

FIGS. 4A and 4B show a 10,000× SEM photograph and energy dispersive X-ray spectroscopy (EDX) measurement results of the negative active material according to Comparative Example 7. As shown in FIGS. 4A and 4B, the dark colored area having crystal particles of 200-300 nm was uniformly surrounded with light colored band phases. From the EDX results, it is understood that the dark colored areas were Si, and the light colored areas were Cu—Al alloy.

Figure 5A:
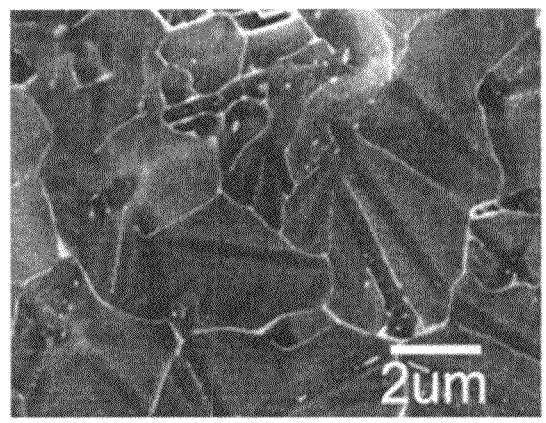
FIGS. 5A to 5D are 10,000× SEM photographs of the negative active material according to Comparative Examples 3 to 6.
Figure 5B:
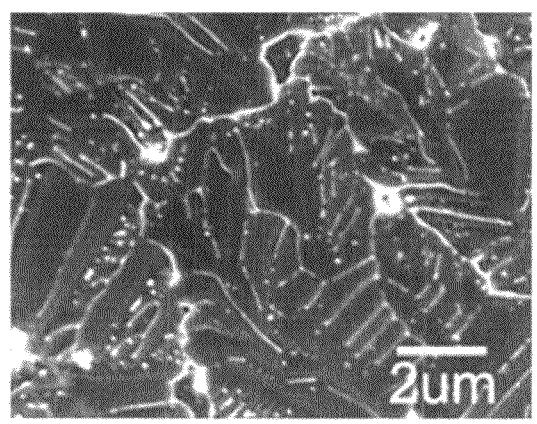
Figure 5C:
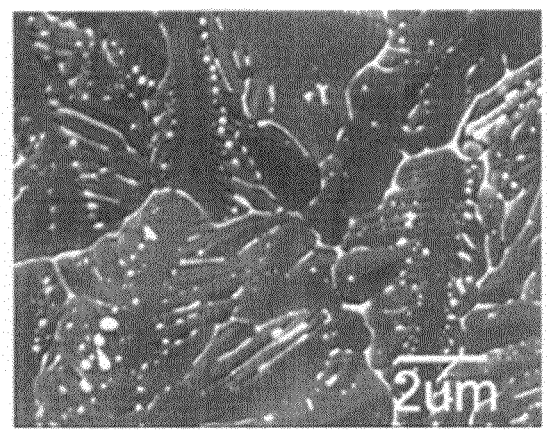
Figure 5D:
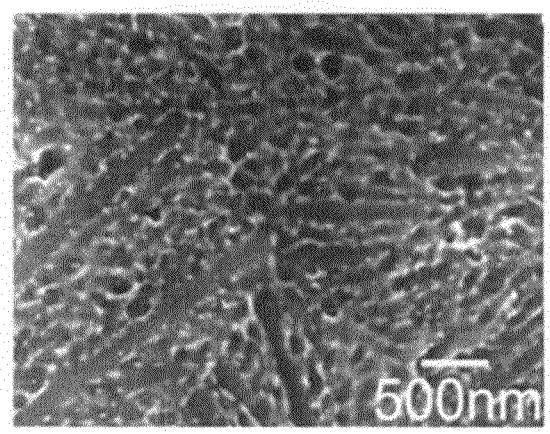

FIGS. 5A to 5D show 10,000× SEM photographs of the negative active materials according to Comparative Examples 3 to 6. FIG. 5A shows Comparative Example 3, FIG. 5B shows Comparative Example 4, FIG. 5C shows Comparative Example 5, and FIG. 5D shows Comparative Example 6. As shown in FIG. 5A to 5D, it is understood that the fine particle structure was not obtained unless the alloy has a suitable composition, even though a Si—Cu-based metal compound was not generated.

Figure 6A:
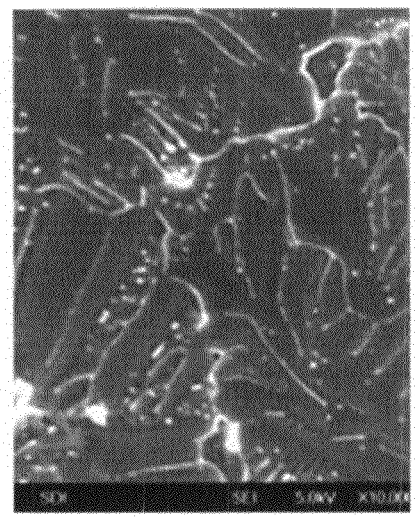
FIGS. 6A to 6C are 10,000× SEM photographs of the negative active material according to Comparative Examples 5, 7, and 8.
Figure 6B:
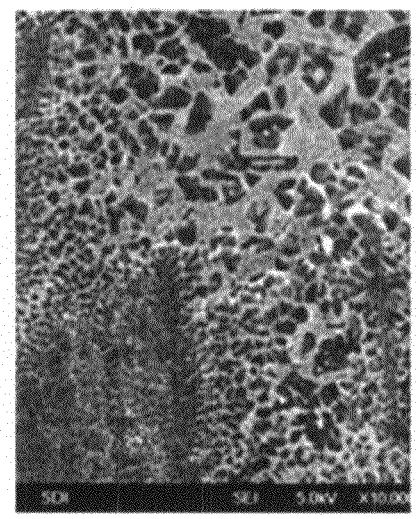
Figure 6C:
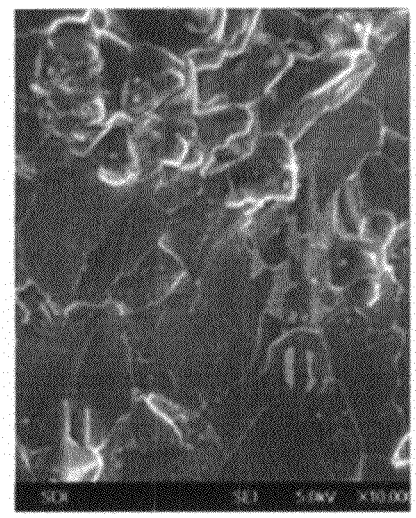

FIGS. 6A to 6C show 10,000× SEM photographs of the negative active materials according to Comparative Examples 5, 7, and 8. FIG. 6A shows Comparative Example 5, FIG. 6B shows Comparative Example 7, and FIG. 6C shows Comparative Example 8. As shown in FIG. 6A to 6C, it is confirmed that the fine particle structure such as in Comparative Example 7 was not formed unless the conditions, such as quenching condition, were identical, even though the alloy composition was constant.

Figure 7A:
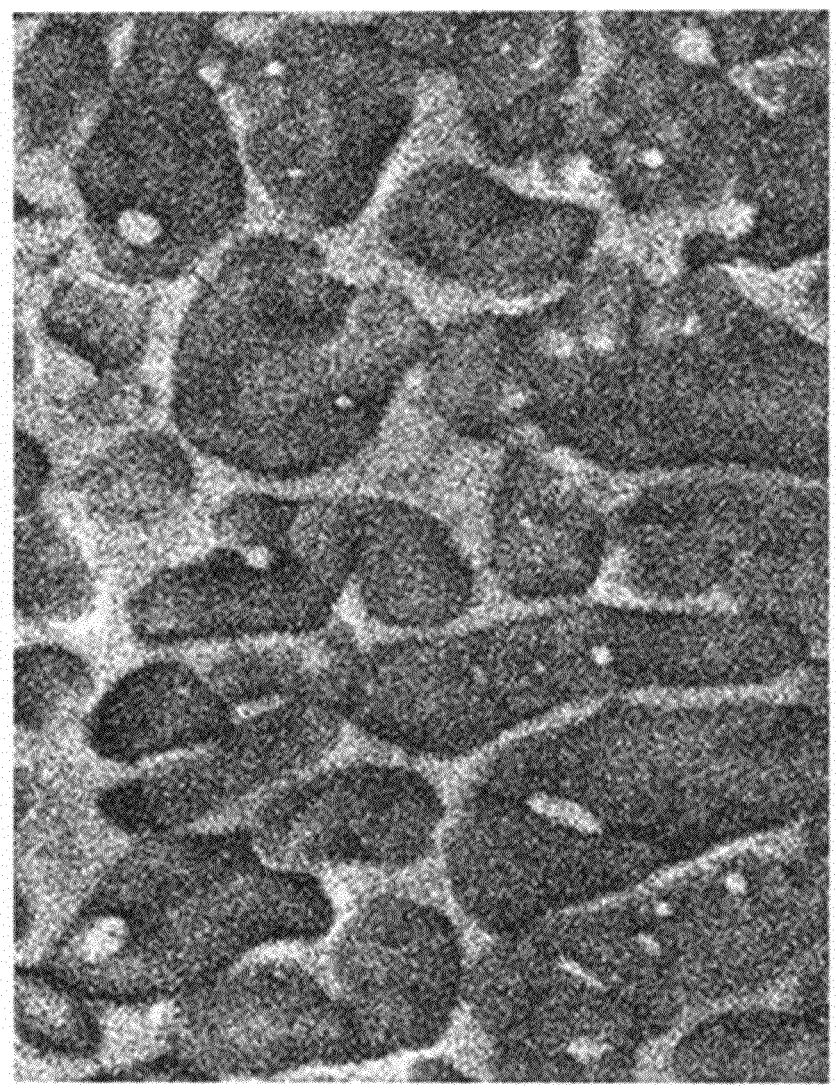
FIGS. 7A to 7E are 10,000× SEM photographs of the negative active material according to Examples 1 to 5.
Figure 7B:
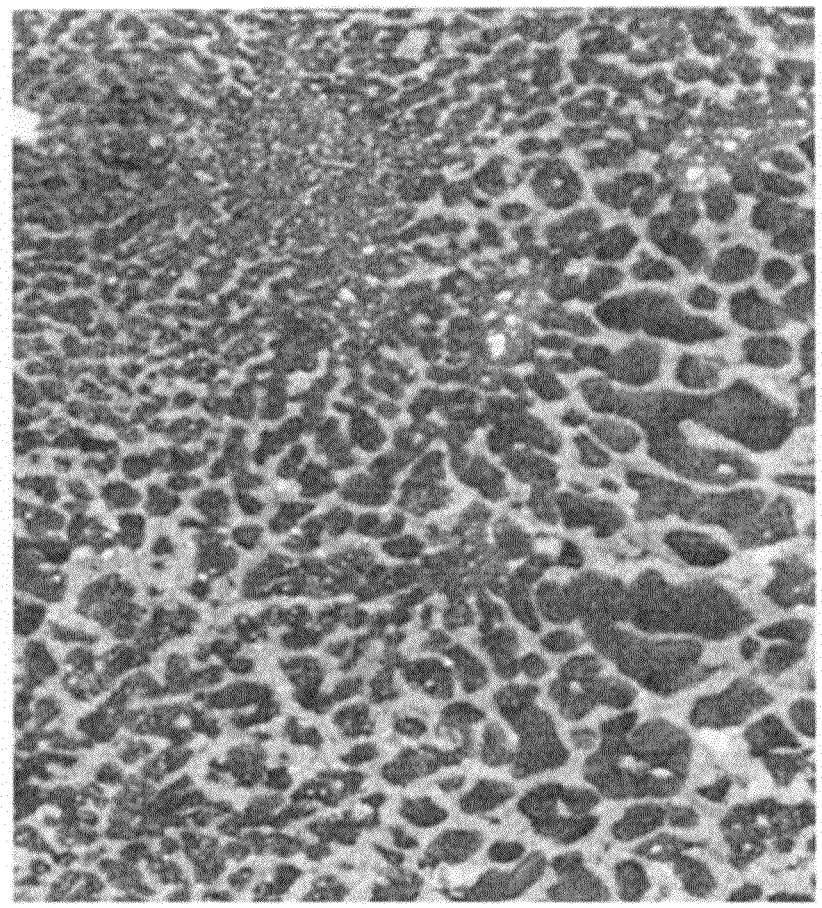
Figure 7C:
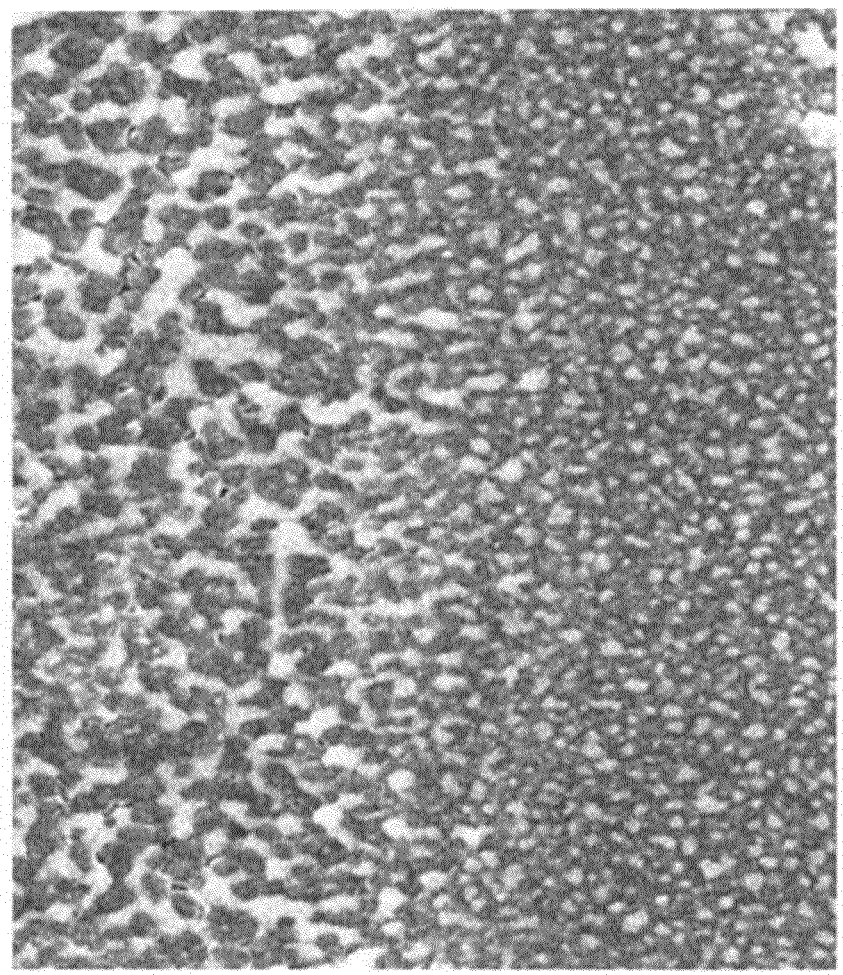
Figure 7D:
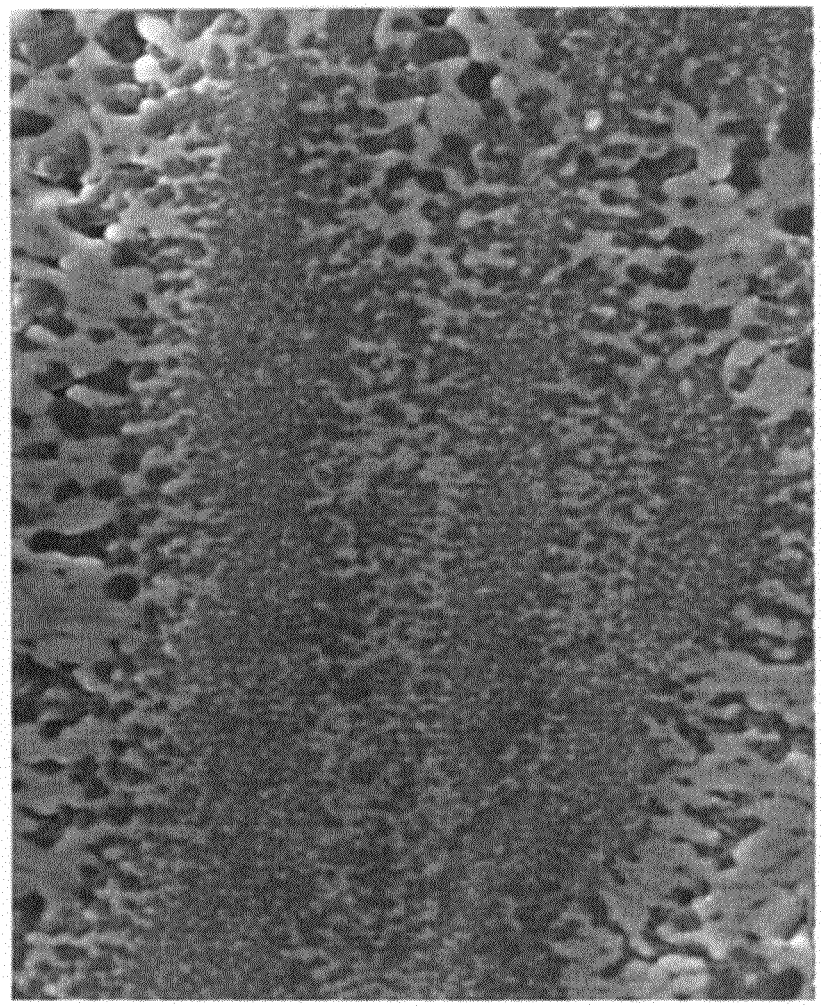
Figure 7E:
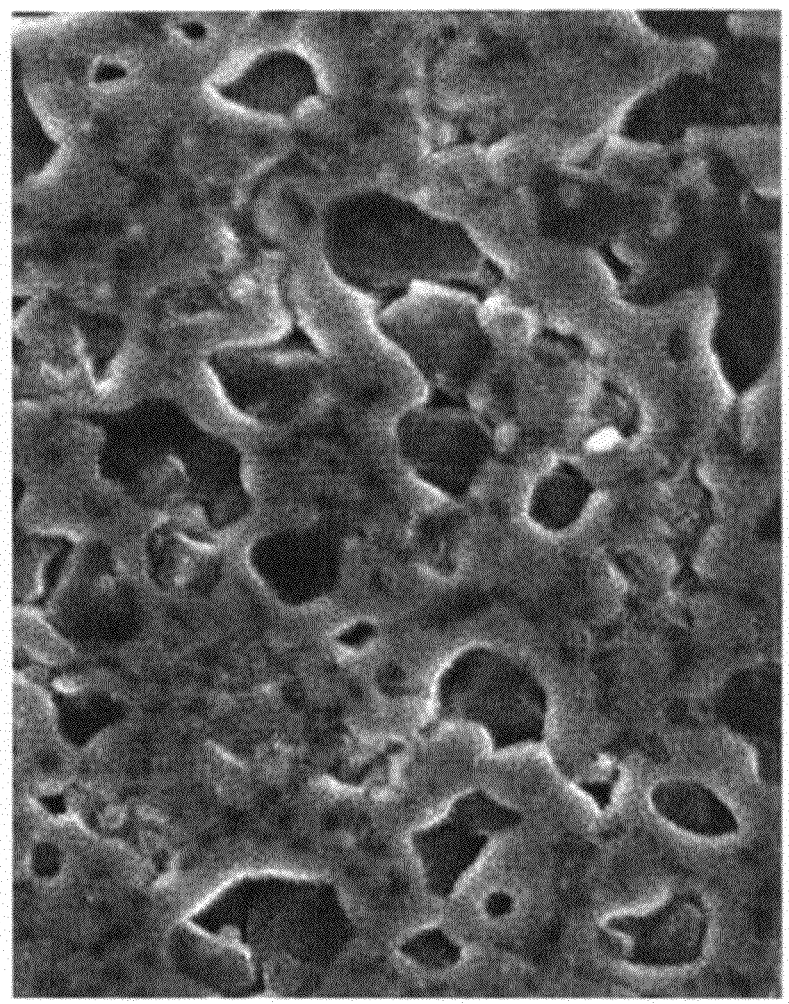

FIGS. 7A to 7E show 10,000× SEM photographs of the negative active materials according to Examples 1 to 5. FIG. 7A shows Example 1, FIG. 7B shows Example 2, FIG. 7C shows Example 3, FIG. 7D shows Example 4, and FIG. 7E shows Example 5. From the results, it is known that adding Sn solved the problems relating to the non-uniformity and the large variation of particle size depending upon the alloy composition and the quenching conditions in the same conventional process. According to Examples 1 to 5, various Si—Cu—Al—Sn alloys were prepared by changing the composition ratio of Si, Cu, Al, and Sn (wherein, the composition ratio between Cu and Al was maintained) to provide a meltspun ribbons quenched at a constant speed of 3,000 rpm. The tendency to get fine particles is different depending on the change of Sn amount. However, the tendency to uniformly surround the Si active particles with the Cu—Al—Sn alloy matrix was maintained.

Figure 8A:
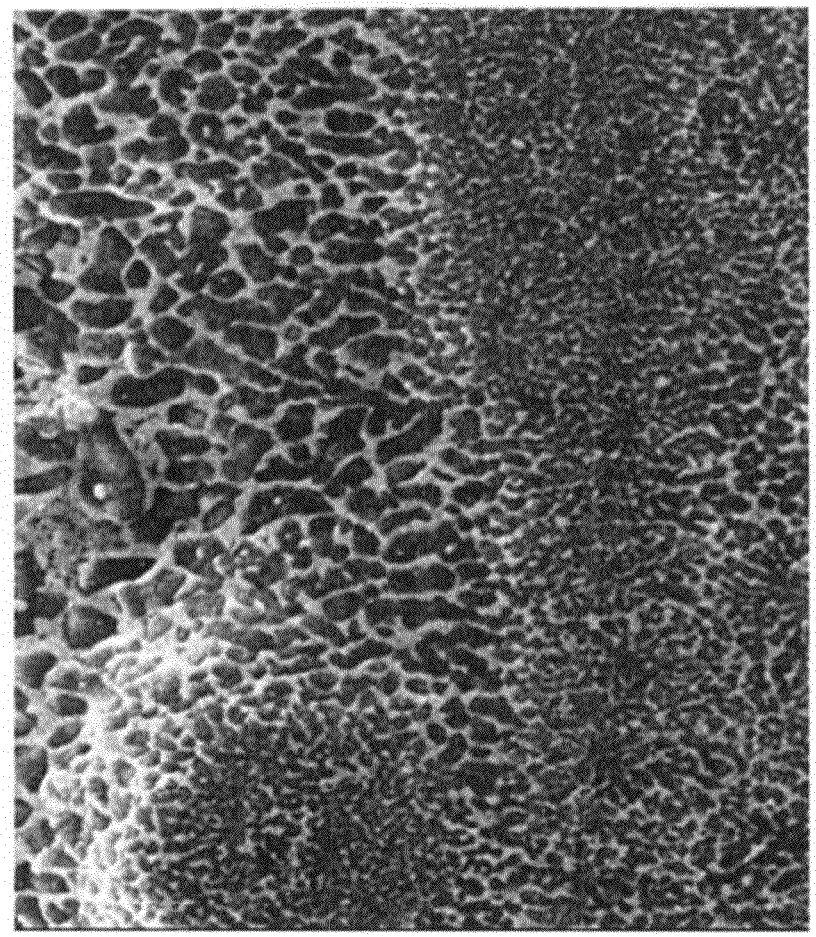
FIGS. 8A to 8E are 10,000× SEM photographs of the negative active material according to Examples 6 to 10.
Figure 8B:
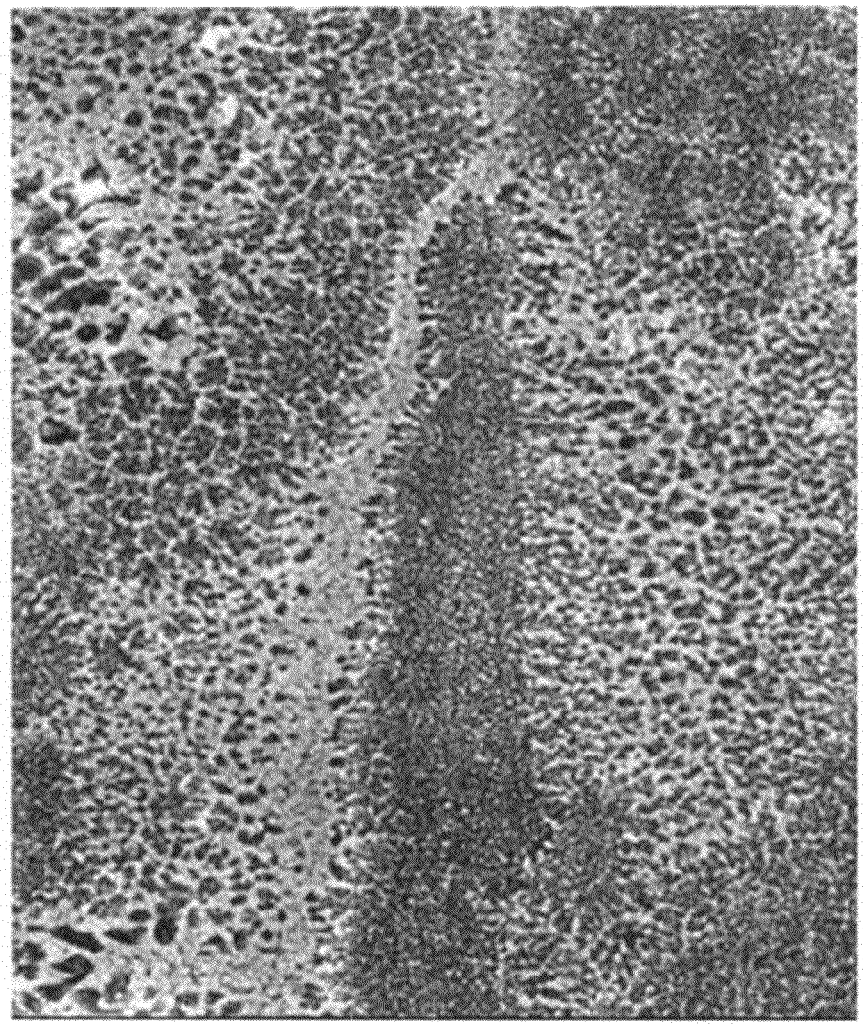
Figure 8C:
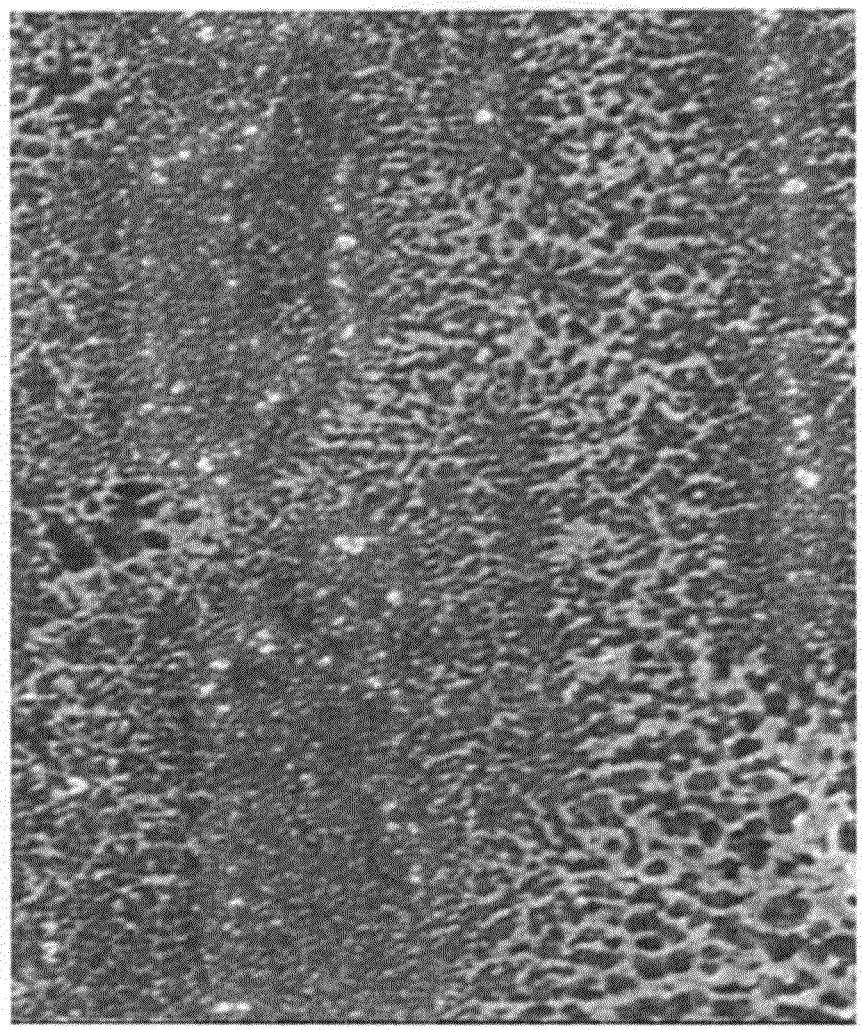
Figure 8D:
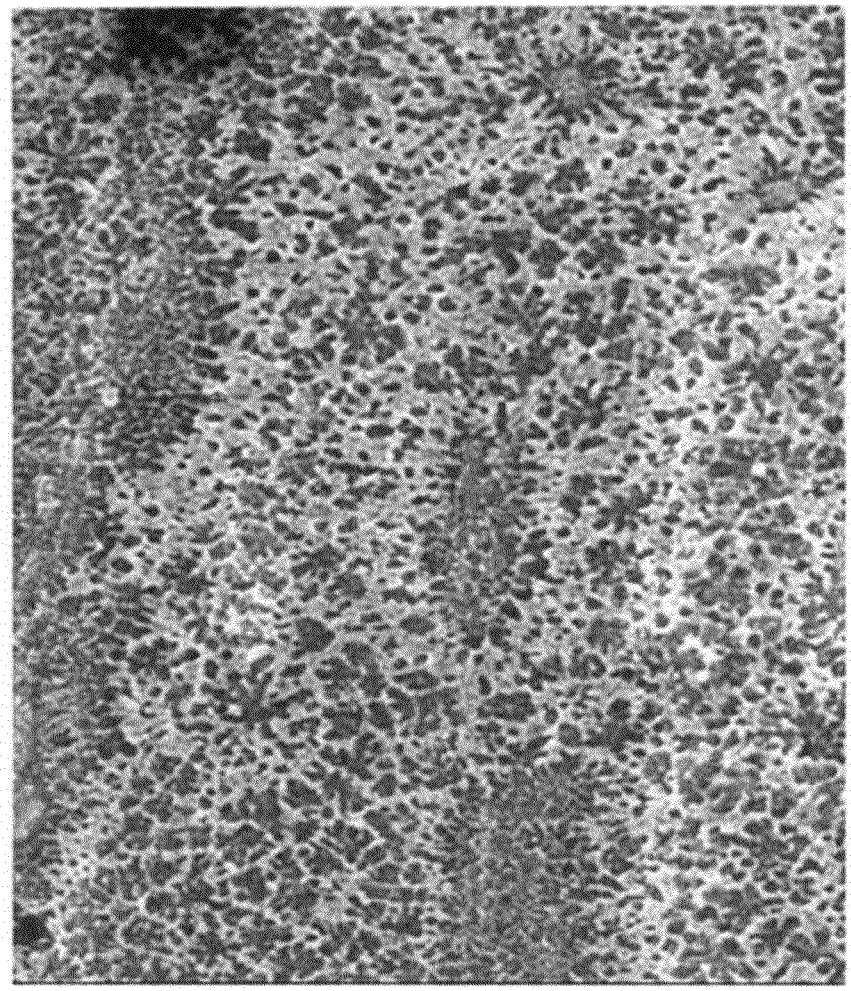
Figure 8E:
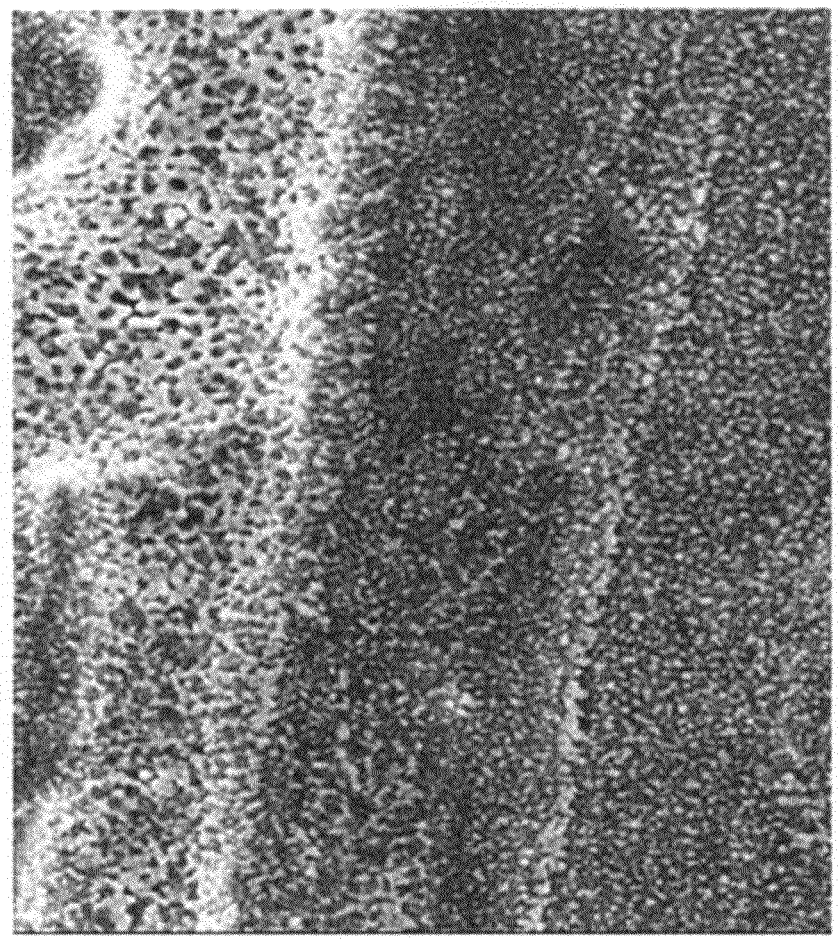

FIGS. 8A to 8E show 10,000× SEM photographs of the negative active materials according to Examples 6 to 10. FIG. 8A shows Example 6, FIG. 8B shows Example 7, FIG. 8C shows Example 8, FIG. 8D shows Example 9, and FIG. 8E shows Example 10. The quenching speed was increased to get the micro-structure, but the Si active particles were still uniformly surrounded with the Cu—Al—Sn alloy matrix as in FIGS. 7A to 7E. From the results, the Si fine particles were uniformly surrounded with the Cu—Al—Sn alloy matrix regardless of the quenching speed.

Figure 9A:
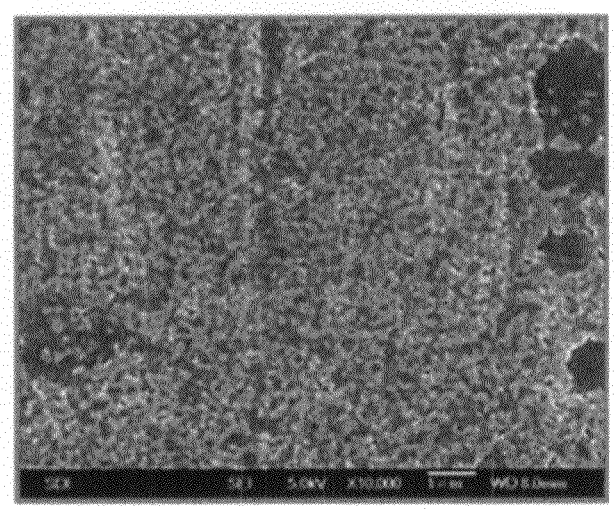
FIGS. 9A and 9B are 10,000× SEM photographs of the negative active materials according to Example 11 and Comparative Example 6.
Figure 9B:
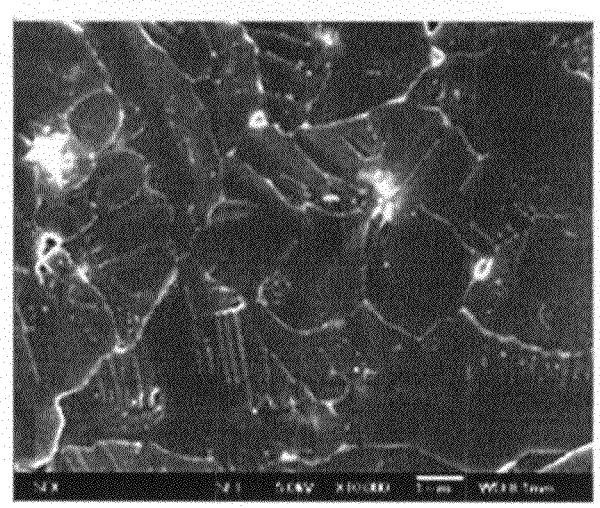

FIGS. 9A and 9B show 10,000× SEM photographs of the negative active materials according to Example 11 and Comparative Example 6. The alloy obtained from Example 11 proved the basic theory that the Si fine particles were uniformly surrounded with the Cu—Al—Sn alloy matrix even though the concentration of the Cu—Al alloy was decreased to 30 wt %. In the case of Comparative Example 6, the silicon concentration was 60 wt %, similar to 63 wt % silicon concentration according to Example 11, but Comparative Example 6, in which Sn was not added, could not provide a fine particle structure as in Example 11.

Figure 10A:
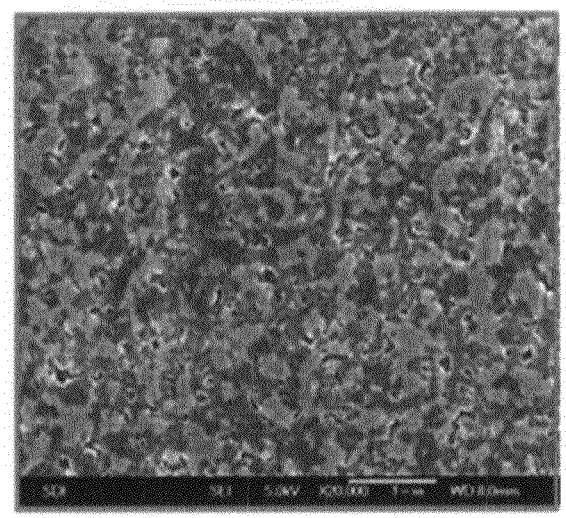
FIGS. 10A and 10B are 20,000× SEM photographs of the negative active materials according to Example 11 and Comparative Example 7.
Figure 10B:
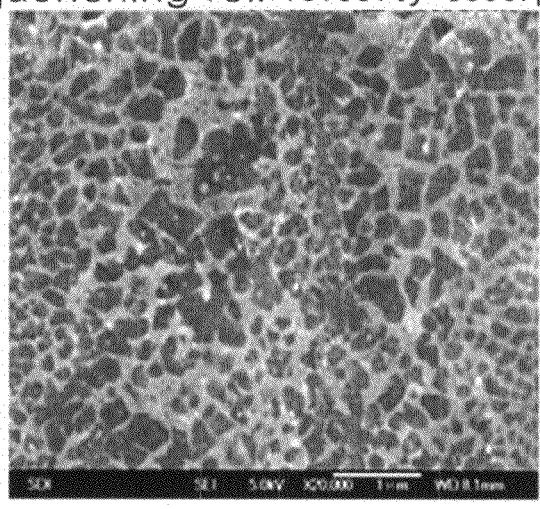

20,000× SEM photographs of the negative active materials obtained from Example 11 and Comparative Example 7 were taken, and the results are shown in FIGS. 10A and 10B, respectively. The negative active materials according to Example 11 and Comparative Example 7 have the form of uniformly surrounding the Si fine particles by the metal matrix. However, it is confirmed that the negative active material according to Example 11 had a finer structure than that of Comparative Example 7, which had the finest particles among the Si—Cu—Al 3-component alloys.

Capacity and Cycle-Life Characteristics Results

Figure 11:
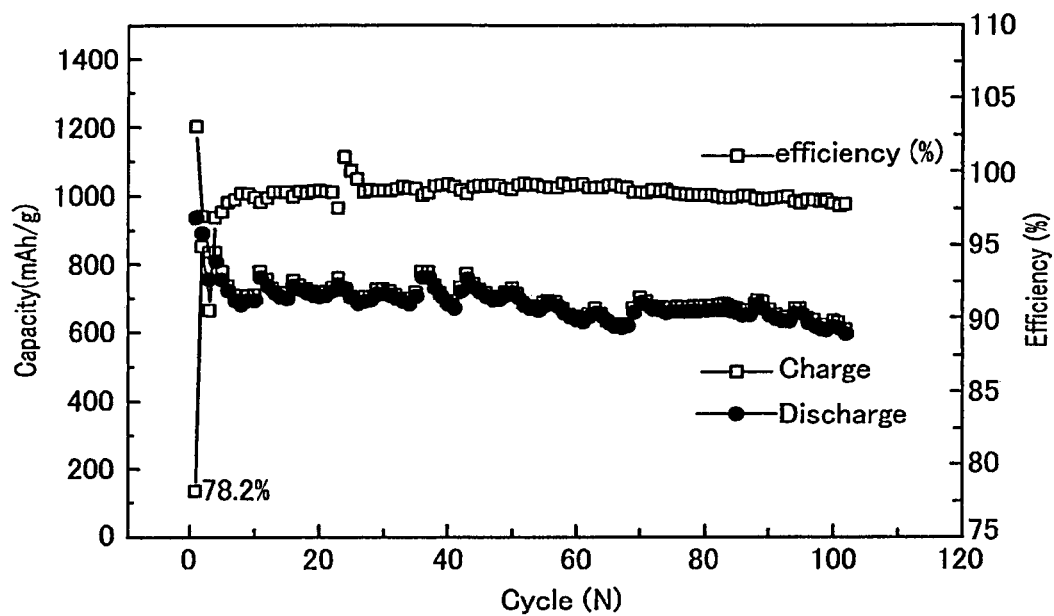
FIG. 11 shows cycle-life and efficiency of the cell according to Example 1 of the present invention.

A coin cell was fabricated with the negative active material obtained from Example 1 and battery characteristic were measured. The results are shown in FIG. 11. The coin cell was initially charged in the cut-off condition of 1200 mAh/g at a speed of 0.1 C/0.1C, and it was charged in the cut-off condition of 940 mAh/g for a second cycle. Then, it was cut-off at 50 mV in 0.5C, and cycle voltammetry (CV) was performed at a current of 0.1C. As shown in FIG. 11, it is confirmed that the initial efficiency was around 78%, and charge and discharge was performed for 100 cycles without deteriorating the cycle-life characteristics. Further, the reversible efficiency was 99% or more.

The negative active material according to the present invention has high capacity and excellent cycle-life characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
   Si active particles in an amount of 30 to 70 wt % based on the weight of the negative active material; and
   a metal matrix being a three component metal matrix surrounding the Si active particles without chemically reacting with the Si active particles, the metal matrix comprising Cu, Al, and an additive metal, the Si active particles and the metal matrix being present in an alloy represented by Formula 1:

$$x\text{Si-}y(a\text{Cu-}b\text{Al})\text{-}z\text{X} \qquad (1),$$

Formula 1 having limitations including:
   x ranges from 30 to 70 wt %;
   y ranges from 30 to less than 70 w-t %;
   z is more than 0 wt % and 30 wt % or less;
   x+y+z is 100 wt %, and y+z is 30 to 70 wt %;
   when a+b is 100 wt %, a weight ratio of a and b ranges from 70:30 to 95:5; and
   X is the additive metal forming a solid-solution alloy with Cu and Al and is Sn.

2. The negative active material of claim 1, the negative active material comprising 40 to 60 wt % of the metal matrix.

3. The negative active material of claim 1, the negative active material comprising 40 to 60 wt % of the Si active particles.

4. The negative active material of claim 3, the Si active particles having an average particle diameter of 10 nm to 500 nm.

5. The negative active material of claim 1, the metal matrix comprising Cu and Al in a weight ratio of from 85:15 to 95:5.

6. The negative active material of claim 1, the Si active particles having an average particle diameter of 10 nm to 1,000 nm.

7. A rechargeable lithium battery comprising:
   a negative electrode comprising a negative active material, the negative active material comprising Si active particles in an amount of 30 to 70 wt % based on the weight of the negative active material and a three component metal matrix surrounding the Si active particles without reacting with the Si active particles, the three component metal matrix comprising Cu, Al, and an additive metal, the Si active particles and the metal matrix being present in an alloy represented by Formula 1:

$$x\text{Si-}y(a\text{Cu-}b\text{Al})\text{-}z\text{X} \qquad (1),$$

Formula 1 having limitations including:
   x ranges from 30 to 70 wt %;
   y ranges from 30 to less than 70 w-t %;
   z is more than 0 wt % and 30 wt % or less;
   x+y+z is 100 wt %, and y+z is 30 to 70 wt %;
   when a+b is 100 wt %, a weight ratio of a and b ranges from 70:30 to 95:5; and
   X is Sn;
   a positive electrode including a positive active material capable of reversely intercalating/deintercalating lithium ions; and
   an electrolyte between the negative electrode and the positive electrode.

8. A method of preparing a negative active material, comprising:
   mixing Si active particles and three kinds of metals to obtain a mixture, the three kinds of metals comprising Cu, Al, and Sn;
   melting the mixture; and
   quenching the molten mixture to prepare the negative active material comprising a metal matrix comprised of said three kinds of metals and the Si active particles surrounded by the metal matrix, an amount of the Si active particles ranging from 30 to 70 wt % based on the weight of the negative active material, the Si active particles and the metal matrix being present in an alloy represented by Formula 1:

$$x\text{Si-}y(a\text{Cu-}b\text{Al})\text{-}z\text{X} \qquad (1),$$

Formula 1 having limitations including:
   x ranges from 30 to 70 wt %;
   y ranges from 30 to less than 70 w-t %;
   z is more than 0 wt % and 30 wt % or less;
   x+y+z is 100 wt %, and y+z is 30 to 70 wt %;
   when a+b is 100 wt %, a weight ratio of a and b ranges from 70:30 to 95:5; and
   X is Sn.

9. The method of claim 8, the quenching comprising spraying the molten mixture onto a rotating kappa roll of which the rotation speed is 2,000 rpm or more.

* * * * *